United States Patent
Raphael et al.

[11] 3,892,814
[45] July 1, 1975

[54] CYCLOPROPANE DERIVATIVES

[75] Inventors: Ralph Alexander Raphael; Robert Douglas Hutton Murray; Roy William Mills, all of Glasgow, Scotland

[73] Assignee: National Research Development Corporation, London, England

[22] Filed: Dec. 22, 1971

[21] Appl. No.: 211,110

[30] Foreign Application Priority Data
Dec. 24, 1970 United Kingdom............... 61320/70

[52] U.S. Cl........ 260/617 R; 260/345.9; 260/468 H; 260/514 H; 260/611 R; 260/666 A
[51] Int. Cl............................................. C07c 33/02
[58] Field of Search.................... 260/617 R, 514 H

[56] References Cited
OTHER PUBLICATIONS
Mills et al. "Chemical Communications," (JCS) p. 555 (1971).

*Primary Examiner*—Donald G. Daus
*Assistant Examiner*—D. B. Springer
*Attorney, Agent, or Firm*—Fleit & Jacobson

[57] ABSTRACT
Allenes of formula

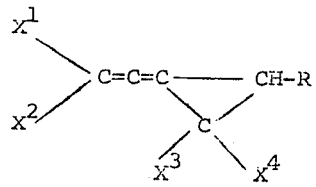

where $X^1$ and $X^2$ are each an alkyl, carboalkoxy, carboxy, hydroxymethyl or aldehyde group or together are an alkylene group, $X^3$ and $X^4$ are each alkyl and R is carboxy, carboalkoxy, hydroxymethyl or etherified hydroxymethyl, are prepared by condensing an ethynyl halide.

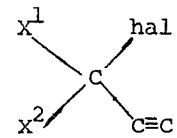

with an allylic compound

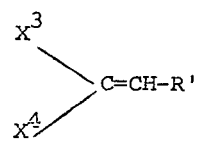

where R' is hydroxymethyl or etherified hydroxymethyl, and, if desired, converting R' to carboxy or carboalkoxy.

The allenes can be reduced, e.g. with sodium in liquid ammonia, to give

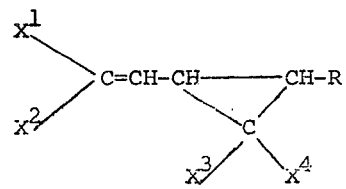

and when R is hydroxymethyl, reduction can be stereoselective to give, for example predominantly (±)-trans-chrysanthemyl alcohol.

8 Claims, No Drawings

CYCLOPROPANE DERIVATIVES

This invention relates broadly to the production of cyclopropane carboxylic acids and precursors thereof and is particularly concerned with a stereoselective synthesis of chrysanthemic acid.

Chrysanthemic acid, pyrethric acid and their analogues are important intermediates in the production of various synthetic pyrethrins. The naturally occurring product is a mixture of esters of chrysanthemic and pyrethric acids with certain substituted cyclopentenolones and in the production of synthetic analogues, it is usually that part of the ester molecule which derives from the alcohol which is modified; the synthetic esters are thus still esters of the naturally occurring acid, usually chrysanthemic acid, since it is easier to synthesise and its esters tend to be more toxic.

Chrysanthemic acid exhibits both optical and geometrical isomerism and each of the geometrical isomers can exist as an optically active (+) or (−) form or as the racemic (±) form. It has found the various isomers of chrysanthemic acid do not give rise to insecticidal esters of equal potency and that generally, the trans acids give rise to more toxic esters than the cis acids although the cis acids generally give rise to esters having better knock-down properties. The most toxic esters are usually derived from (+)-trans chrysanthemic acid and it is therefore important to have available stereoselective syntheses of chrysanthemic and related acids, which will enable for example the trans isomer to be produced exclusively, or at least as the predominant isomer.

At the moment, most of the trans chrysanthemic acid used commercially is prepared by one of two methods. The more recent method involves reacting 1-chloro-3-methyl-butene-2 with the sodium salt of benzene sulphinic acid and reacting the resulting 3-methyl-but-2-enyl ester of benzene sulphinic acid with the ethyl ester of 2,2-dimethyl-acrylic acid in the presence of a strong base e.g. potassium butoxide. Condensation and cyclisation occurs to give ethyl chrysanthemate. The second and older method involves the hydrogenation of 2,5-dimethyl-2,5-dihydroxy-hexyne-3, dehydration of the resulting saturated hydrocarbon to give 2,5-dimethyl-hexadiene-2,4, and reaction of this diene with ethyl diazoacetate in the presence of copper catalyst to give ethyl chrysanthemate. However, the first mentioned method requires the formation of the intermediate sulphinic ester and involves the loss of a 6 carbon atom fragment which is not converted into the final product while the last mentioned method involves the use of the expensive and dangerous ethyl diazoacetate and only produces about 65–70% ethyl chrysanthemate in the trans form. The remaining product is produced in the cis form which must be isomerised in a further step.

The present invention provides a simple and inexpensive method for the production of chrysanthemic acid and related acids and precursors thereof which involves reduction of a novel allenic compound.

Accordingly, one aspect of the present invention provides a process for the production of a cyclopropane carboxylic acid or precursor thereof of general formula:

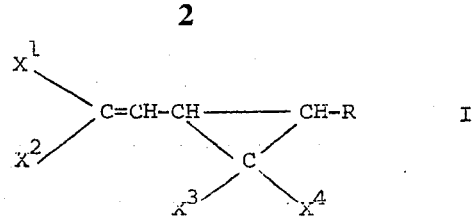

wherein $X^1$ and $X^2$, which may be the same or different, each represents an alkyl, carboalkoxy, carboxy, hydroxymethyl or aldehyde group or $X^1$ and $X^2$ together represent an alkylene group and $X^3$ and $X^4$, which may be the same or different, each represents a hydroxymethyl group, and R represents a hydroxymethyl group, an etherified hydroxymethyl group, or a carboxy or carboalkoxy group, which comprises reducing an allenic compound of formula:

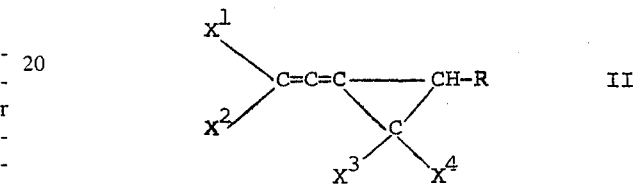

It is preferred that $X^3$ and $X^4$ each represents an alkyl group of 1 to 4 carbon atoms, and preferably both $X^3$ and $X^4$ represent methyl. $X^1$ and $X^2$ each preferably represents an alkyl group containing 1 to 4 carbon atoms, particularly a methyl group, or $X^1$ represents an alkyl group, particularly methyl, and $X^2$ represents a carboalkoxy group, preferably carbomethoxy or $X^1$ and $X^2$ together represent an alkylene group $—(CH_2)_n—$ where $n = 4$ or 5 so that $X^1 X^2 C$ together represents for example a cyclopentylidene group, ($X^1$ and $X^2$ = tetramethylene). When the hydroxymethyl group R is etherified, it is preferably etherified with a conventional hydroxy protecting group such as tetrahydropyranyl group; when R is a carboalkoxy group, the alkyl residue preferably contains 1 to 4 carbon atoms.

The process has particular applicability to the production of chrysanthemic acid, pyrethric acid and 2-cyclopentylidenemethyl-3,3-dimethyl cyclopropane carboxylic acid, and, in the case where R in the allene to be reduced is not a carboxy group, R may be converted to a carboxy group by known methods either before or preferably after the reduction of the allene.

It is found that the reduction of the allene proceeds very rapidly when it is added to a solution of an alkali metal, e.g. sodium or potassium, in liquid ammonia.

When R in the allene is hydroxymethyl, it is found that the reduction proceeds stereoselectively to give at least about 70% by weight of the compound in which the two hydrogen atoms on the cyclopropane ring are in the trans relationship to one another. When $X^1 = X^2 = X^3 = X^4 = CH_3$, this compound is trans-chrysanthemyl alcohol. When R has one of the other values mentioned above, the reduction proceeds equally rapidly but not stereoselectively.

Trans-chrysanthemyl alcohol or other hydroxymethyl compound of formula I can be oxidised by known methods for selective oxidation of a hydroxymethyl group to a carboxyl group, for example by mixing the hydroxy methyl compound with chromium trioxide in pyridine and subsequently adding water. It is found that oxidation to the aldehyde stage proceeds very rapidly but that addition of a small amount of water, e.g. 1–10% volume of the reaction mixture, once the oxidation has progressed substantially completely to the aldehyde, facilitates the further oxidation to the carboxylic acid. This oxidation is preferably carried out at about 10°–25°C. Selective oxidation of hydroxymethyl to carboxy can also be achieved using Jones' reagent (chromium trioxide, water and sulphuric acid) and chromium trioxide in aqueous pyridine but yields are less satisfactory than those obtained in the method described above.

An etherified hydroxymethyl group or a carboalkoxy group may also be converted by known methods.

A key intermediate in the new synthesis is the new allenic compound of formula:

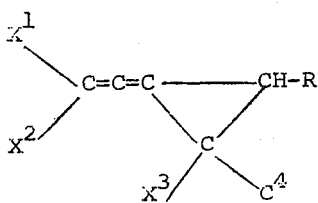

II.

which constitutes a further embodiment of the invention. This compound may be prepared by condensing an ethynyl halide of formula III (hal = halogeno, preferably chloro) with an allylic compound of formula IV

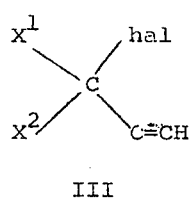   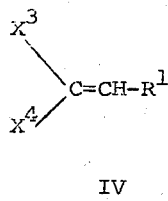

III                IV where $X^1$, $X^2$, $X^3$ and $X^4$ are as defined above and $R^1$ represents a hydroxy methyl group or etherified derivative thereof. This condensation reaction, in which all the carbon atom content of the reactants is converted into the final product, may be carried out in the presence of an inorganic or organic base e.g. an alkali metal hydroxide or alkoxide, conveniently, but not necessarily, one derived from the allylic alcohol. The condensation may be carried out in the presence of an excess of the allylic compound as solvent or alternatively, in the presence of an inert organic solvent.

The amount of base used in the condensation should be substantially equimolar to the amount of ethynyl halide, to react with the hydrogen halide evolved during the condensation. The ethynyl halide and allylic compound react with one another in substantially equimolar amounts and such proportions may be used when the reaction is carried out in the presence of the inert solvent. Such solvents include hydrocarbons such as pentane or benzene; tetrahydrofuran may also be used.

When the condensation is carried out in the presence of an excess of the allylic compound as diluent, the excess may conveniently be about a four-fold molar excess based on the ethynyl halide.

The following Examples are given to illustrate the invention. Temperatures are in °C.

EXAMPLE 1

Trans-chrysanthemic acid a. Production of 2-(2'-methylpropenylidine)-3,3-dimethylcyclopropanemethanol (V) in absence of solvent A flask containing 3,3-dimethylallyl alcohol (15g., 0.175 moles) is flushed with dry nitrogen for 30 minutes and potassium t-butoxide (5.06 g., 0.045 moles) added. The slurry is stirred and cooled to –10° and 3-chloro-3-methyl-1-butyne (4.64 g., 0.045 moles) then added over a 30 minute period with the temperature maintained at –10° to 0°. Stirring is continued for 3 hours, during which time the temperature is allowed to rise slowly to room temperature. Excess 3,3-dimethyl-allyl alcohol is removed under reduced pressure (30°/0.1 mm. Hg.) and pentane (50 ml.) added to the residue, which is then filtered.

The solid is washed with n-pentane (3 × 20 ml.), and the solvent removed from the combined filtrates under reduced pressure (20 mm. Hg.). The allene V (3.1 g., 45%) is isolated as a mobile oil from the residue (8 g.) by column chromatography over silica (300 g.) eluting with ethyl acetate-light petroleum (15:85). Allene V distills at 40°/0.02 mm.Hg and its p-nitrobenzoate is of m.p. 98°–99° (from either:light petroleum). (Found: C, 67.6; H, 6.22: $C_{17}H_{19}NO_6$ requires C, 67.76; H, 6.36).

b. Production of 2-(2'-methylpropenylidene)-3,3-dimethylcyclopropane methanol (V) in presence of solvent A flask containing a solution of 3,3-dimethylallyl alcohol (4.1 g., 0.048 moles) in n-pentane (30 ml.) is flushed with dry nitrogen for 30 minutes and potassium t-butoxide (5.3 g., 0.047 moles) added. The slurry is stirred and cooled to –10° and 3-chloro-3-methyl-1-butyne (4.72 g., 0.047 moles) in n-pentane (10 ml.) then added dropwise over a 30 minute period with the temperature maintained at –10° to 0°. Stirring is continued for 3 hours during which time the temperature is allowed to rise slowly to room temperature. The reaction mixture is filtered and the solid washed with n-pentane (3 × 20 ml.). The allene V (1.4 g., 20%) is isolated by the procedure described in section (a) above.

c. The procedure described in section (b) above was repeated using different solvents and bases; the results of these experiments are summarized below.

| Base | Solvent | Yield of allene V |
|---|---|---|
| KOBu$^t$ | Benzene | 20% |
| KOBu$^t$ | THF | 20% |
| KOH | 3,3-dimethylallyl alcohol | 35% |
| NaOH | 3,3-dimethylallyl alcohol | 35% |
| K t-amylate | Benzene | 20% |

THF = tetrahydrofuran, KOBu$^t$ = potassium tert. butoxide, K t-amylate = potassium tert. amylate.

d. Chrysanthemyl alochol (XIII)

Sodium (100 mg., 4.3 m. mol.) is dissolved in liquid ammonia (10 ml.) contained in a flask fitted with an acetone/$CO_2$ condenser. A solution of the allene (V) as obtained in Sections (a) (b) or (c) above (300 mg., 2 m.mol.) in dry diethyl ether (3ml.) is added dropwise with stirring to the liquid ammonia solution. After 1 hour's further stirring, excess sodium is destroyed by the addition of ammonium chloride and the ammonia removed by gentle heating. Water (2 ml.) is added to the reaction flask followed by extraction of the contents with ether to yield, after conventional work-up, racemic chrysanthemyl alcohol (XIII, trans: cis weight ratio = 3:1) (270 mg., 90%), identical in every respect (t. l. c., I.R., N.M.R., M.S.) with a genuine sample. Crystallisation of the 3:5-dinitrobenzoate of XIII preferentially afforded the dinitrobenzoate of the trans isomer, the m.p. of which 97°–105° was not depressed by admixture with a genuine sample (needles from ether:- light petroleum). (Found: C, 58.56; H, 5.69; N, 8.06; $C_{17}H_{20}N_2O_6$ requires C, 58.61, H, 5.79; N, 8.04%).

e. Oxidation of chrysanthemyl alcohol (XIII) to chrysanthemic acid.

AnalaR chromium trioxide (1 g., 0.01 mol.) is added carefully to dry pyridine (10 ml.) at 0°. The alochol (XIII) (380 mg., 2.5 m.mol) in dry pyridine (3ml.) is added in one portion and the reaction left to stir at about 15°–20°C for 24 hours, at the end of which time the oxidation of the hydroxymethyl group has progressed to the aldehyde stage (t.l.c.). Five drops of water are now added and the reaction left stirring for a further 4 days.

The reaction mixture is then poured into water (25 ml.) and diethyl ether (5 ml.) added. Powdered sodium bisulphate is added until the pH reaches 3 or 4 and the product extracted with diethyl ether (3 × 50 ml.). The combined ether extracts are washed with brine, dried over magnesium sulphate and warmed under reduced pressure to remove the solvent. The product (300 mg.) was shown (t.l.c., light pretroleum:ethyl acetate 60:40, I.R. and N.M.R.) to comprise about 25% chrysanthemaldehyde and 75% (±) chyrysanthemic acid XII (trans:cis weight ratio = 3:1), the latter being obtained in overall yield of 55% based on alcohol XIII. Preparative t.l.c. (ethyl acetate/petrol 40:60) followed by sublimation gave (±) trans-chrysanthemic acid, identical in properties to a genuine sample (I.R., N.M.R., M.S., t.l.c.); m.p. 46°–48°, not depressed on admixture with genuine material.

EXAMPLE 2

2-cyclohexylidenemethyl-3,3-dimethylcyclopropane carboxylic acid from 2-cyclohexylidenemethylene-3,3-dimethylcyclo- propanemethanol (VI)

a. 1-Ethynylcyclohexyl Chloride

1-Ethynylcyclohexanol (50 g., 0.4 moles) is added to a solution of freshly prepared cuprous chloride (8.g., 0.1 moles) in concentrated hydrochloric acid (175 ml.). After 1 hour of intermittent shaking, the upper layer is washed with concentrated hydrochloric acid (2 × 80 ml.), shaken with anhydrous potassium carbonate and dried over-night over a fresh layer of potassium carbonate. Distillation gives 40 g., (70%) of 1-ethynylcyclohexyl chloride, b.p. 57°–60° (10 mm.).

b. Preparation of 2-cyclohexylidenemethylene-3,3-dimethyl-cyclopropanemethanol (VI) in absence of solvent.

Using the same reaction conditions and work-up procedure as described in Example 1(a) above, 3,3-dimethylallyl alcohol (10 g., 0.12 mol.) is treated with potassium t-butoxide (3.38 g., 0.03 mol.) and 1-ethynylcyclohexyl chloride (4.32 g., 0.03 mol.) to yield 2-cyclohexylidenemethylene-3,3-dimethylcyclo- propanemethanol (VI) (1.16 g., 20%) m.p. 45°–46°, 3,5-dinitrobenzoate m.p. 82°–84°C (needles from ether: light petroleum). Found C, 61.98; H, 5.95; N, 6.94; $C_{20}H_{22}N_2O_6$ requires C, 62.17; H, 5.74; N, 7.25%).

c. Preparation of 2-cyclohexylidenemethylene-3,3-dimethylcyclopropanemethanol (VI) in presence of solvent.

Using the same reaction conditions and work-up procedure as described in Example 1(b) above, 3,3-dimethylallyl alcohol (5.16 g., 0.06 mol.) is treated with potassium t-butoxide (6.66 g., 0.06 mol.) and 1-ethynylcyclohexyl chloride (8.56 g., 0.06 mol.) in n-pentane (50 ml.) to yield 2-cyclohexylidenemethylene-3,3-dimethylcyclopropanemethanol (VI)(1.04 g., 10%).

d. 2-Cyclohexylidenemethyl-3,3-dimethylcyclo- propanemethanol (X)

Using the same reaction conditions and work-up procedure as described in Example 1(d) above, the allene VI (195 mg., 1.0 m.mole) in dry diethyl ether (4 ml.) is added to a solution of sodium (50 mg., 2.2 m.mole) in liquid ammonia (10 ml.) to produce the racemic alcohol (X, trans: cis weight ratio = 3:1) (177 mg., 90%). The trans-isomer is characterised as the 3,5-dinitrobenzoate m.p. 110°–112° (needles from ether:- light petroleum), and separated from the cis isomer by preferential formation of the trans dinitrobenzoate ester. (Found: C, 61.82; H, 6.04; N, 6.95; $C_{20}H_{24}N_2O_6$ requires C, 61.85; H, 6.23, N,7.21%).

e. Oxidation of 2-cyclohexylidenemethyl-3,3-dimethyl- cyclopropanemethanol X to 2-cyclohexylidenemethyl- 3,3-dimethylcyclopropane carboxylic acid.

AnalaR chromium trioxide (0.370 g., 3.7 m.mol) is added carefully to dry pyridine (5 ml.) at 0°. The alcohol X (175 mg., 0.9 m.mol.) in dry pyridine (2 ml.) is added in one portion and the reaction allowed to stir at about 15°–20° for 24 hours, at the end of which time three drops of water were added and the reaction allowed to stir for a further 4 days. The product is then worked up by the procedure described in Example 1(e) to give a product (100 mg.) shown by t.l.c., in petroleum ether:ethyl acetate, 60:40; I.R., and N.M.R. to comprise about 90% (±) 2-cyclohexylidenemethyl-3,3-dimethylcyclopropanecarboxylic acid (XV) (trans:cis weight ratio 3:1) and 10% of the corresponding aldehyde, the overall yield of acid being 50%. The compound was characterised by M.S., N.M.R. and I.R.

EXAMPLE 3

2-cyclopentylidenemethyl-3,3-dimethylcyclopropane carboxylic acid from 2-cyclopentylidenemethylene-3,3-cyclopropane methanol (VII)

a. 1-Ethynylcyclopentyl Chloride

1Ethynylcyclopentanol (25 g.) is reacted as described in Example 2(a) above with cuprous chloride (4.5 g.) and concentrated hydrochloric acid (100 ml.). After drying over potassium carbonate, the product was immediately distilled from fresh $K_2CO_3$ to yield 15 g. (55%) of 1-ethynylcyclopentyl chloride b.p. 42°–50° (15 mm.).

b. Production of 2-cyclopentylidenemethylene-3,3-dimethylcyclopropanemethanol (VII) in absence of solvent.

Using the same reaction conditions and work-up procedure as described in Example 1(a) above, 3,3-dimethylallyl alcohol (4.0 g., 0.05 mol) is treated with potassium t-butoxide (2.6 g., 0.023 mol.) and 1-ethynylcyclopentyl chloride (3.0 g., 0.023 mol.) to yield 2-cyclopentylidenemethylene-3,3-dimethylcyclopropanemethanol (VII) (0.415 g., 10%), a mobile oil which is characterised as its 3,5-dinitrobenzoate m.p. 151°–152° (needles from ether:light petroluem). Found C, 61.08; H, 5.45; N, 7.52. $C_{19}H_{20}N_2O_6$ requires C, 61.28; H, 5.41; N, 7.52%).

c. Production of 2-cyclopentylidenemethylene-3,3-dimethylcyclopropanemethanol (VII) in presence of solvent Using the same reaction conditions and work-up precedure as described in Example 1(b) above, 3,3-dimethylallyl alcohol (4.63 g., 0.008 mol.) is treated with potassium t-butoxide (5.96 g., 0.053 mol.) and 1-ethynylcyclopentyl chloride (6.94 g., 0.053 mol.) in n-pentane (50 ml.) to yield 2-cyclopentylidenemethylene-3,3-dimethylcyclopropanemethanol VII (0.20 g., 2%).

d. 2-Cyclopentylidenemethyl-3,3-dimethylcyclopropanemethanol (XI)

Using the same reaction conditions and work-up procedure as described in Example 1 (d) above, the allene VII (240 mg., 1.35 m.mol.) in dry ether (4 ml.) is added to a solution of sodium (70 mg., 3.0 m.mol.) in liquid ammonia (10 ml.) to produce the racemic alcohol (XI trans:cis weight ratio = 3.1) (195 m.g., 80%). The trans-isomer is characterised as the 3,5-dinitrobenzoate, m.p. 106°–108° (prisms from ether:-light petroleum) and separated from the cis isomer by preferential formation of the trans dinitrobenzoate ester. (Found: C, 60.97; H, 5.96; N, 7.38. $C_{19}H_{22}N_2O_6$ requires C, 60.95; H, 5.92; N, 7.48%).

e. Oxidation of 2-cyclopentylidenemethyl-3,3-dimethylcyclopropanemethanol (XI) to 2-cyclopentylidenemethyl-3,3-dimethylcyclopropane carboxylic acid.

AnalaR chromium trioxide (1 g., 0.010 mol.) is added carefully to dry pyridine (15 ml.) at 0°. The alcohol XI (495 mg., 2.9 m.mol.) in dry pyridine (5 ml.) is added in one portion and the reaction allowed to stir at 15°–20° for 24 hours, at the end of which time five drops of water were added and the reaction allowed to stir for a further 6 days. The product is then worked up by the procedure described in Example 1(e) to give a product (336 mg.) shown by t.l.c. petroleum ether ethyl acetate 60:40, I.R. and N.M.R. to comprise about 70% (±)-2-cyclopentylidenemethyl-3,3-dimethylcyclopropane carboxylic acid XVI (trans:cis weight ratio = 3;1) and 30% of the corresponding aldehyde, the overall yield of acid being 45%.

EXAMPLE 4 a. 2-(2'-methylpropenylidene)3,3-dimethylcyclopropanemethyl tetrahydropyranyl ether (IX)

2-(2'-methylpropenylidene)-3,3-dimethylcyclopropanemethanol (2.24 g., 1.5 m.mol.) (prepared as described in Example 1) and freshly distilled dihydropyran (0.148 g., 1.7 m.mol.) are stirred in dry benzene (4 ml.) at 0° in the presence of a catalytic amount of phosphoryl chloride for 1.5 hours. The solution is then poured into diethyl ether (10 ml.) and washed successively with 10 ml. amounts of dilute sodium hydroxide, water and brine. After drying and removal of solvent, IX is obtained in good yield (0.310 g., 90%).

b. 2-Isobut-1-enyl-3,3-dimethylcyclopropanemethyl tetrahydropyranyl ether (XII)

Using the same reaction conditions and work-up procedure as described in Example 1(d) above, allene IX (127 mg., 0.55 m.mol.) in dry ether (4 ml.) is added to a solution of sodium (40 mg., 1.7 m.mol.) in liquid ammonia (5 ml.) to produce the olefinic tetrahydropyranyl ether (XII)(118 mg., 92%).

c. Cleavage of tetrahydropyranyl ether (XII).

The tetrahydropyranyl ether XII (110 mg.) is refluxed in ethanol (4 ml.) for 2 hours in the presence of a catalytic amount of p-toluenesulphonic acid. After cooling, the solvent is removed under reduced pressure and water (3 ml.) added. Neutralization with sodium bicarbonate is followed by extraction with diethyl ether and conventional work-up to give chrysanthemyl alcohol (64 mg., 90%) which was present in a cis:trans weight ratio of 1:1 (confirmed by N.M.R. and g.l.c.)

EXAMPLE 5

Oxidation of 2-(2'-methylpropenylidene)-3,3-dimethylcyclopropanemethanol (V)

AnalaR chromium trioxide (1.1 g., 0.011 mol.) is added carefully to dry pyridine (15 ml.) at 0°. The alcohol V (460 mg., 3.0 m.mol.) in dry pyridine (5 ml.) is added in one portion and the reaction allowed to stir at about 15°–20° for 24 hours, at the end of which time 5 drops of water is added and the reaction allowed to stir for a further 14 days. The work-up was the same as described in Example 1 (e) above. The product (265 mg.) was shown by t.l.c., in petroleum ether:ethyl acetate 60:40 and by N.M.R. to comprise about 80% (±)-2-(2'-methylpropenylidene)-3,3-dimethylcyclopropane carboxylic acid XVIII and 20% of the corresponding aldehyde, the overall yield of acid being 40%. XVIII when purified by preparative t.l.c. in petroluem ether-:ethyl acetate 60:40, was an oil at normal temperature but solidified on standing in the refrigerator. Its structure was confirmed by I.R., N.M.R. and M.S.

We claim:

1. An allene compound of the formula:

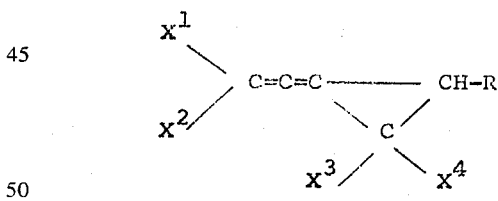

wherein $X^1$ and $X^2$ independently represent an alkyl group of 1 to 4 carbon atoms or together represent a —$(CH_2)_n$—group where $n$ is 4 or 5, $X^3$ and $X^4$ independently represent an alkyl group of 1 to 4 carbon atoms and R represents a hydroxymethyl group.

2. A compound according to claim 1 wherein $X^3$ and $X^4$ each represent a methyl group.

3. A compound according to claim 1 wherein $X^1$ and $X^2$ each represent a methyl group.

4. A compound according to claim 1 wherein $X^1$ and $X^2$ together represent an alkylene group of formula —$(CH_2)_n$—wherein $n$ is 4 or 5.

5. A compound according to claim 4 wherein $X^1$ and $X^2$ together represent a tetramethylene group.

6. The allene compound of claim 1 which has the formula
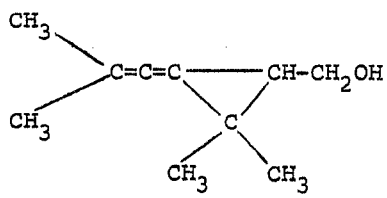
7. The allene compound of claim 1 which has the formula
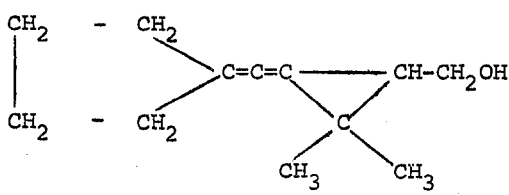
8. The allene compound of claim 1 which has the formula
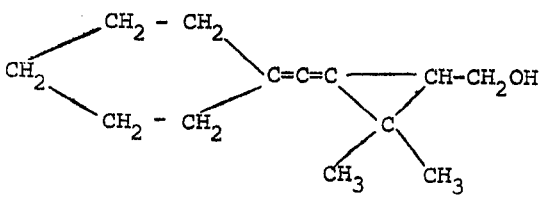
* * * * *